United States Patent
Raghavan et al.

(10) Patent No.: US 11,900,181 B2
(45) Date of Patent: *Feb. 13, 2024

(54) SYSTEM AND METHOD FOR LINEARIZING MESSAGES FROM DATA SOURCES FOR OPTIMIZED HIGH-PERFORMANCE PROCESSING IN A STREAM PROCESSING SYSTEM

(71) Applicant: FAIR ISAAC CORPORATION, Roseville, MN (US)

(72) Inventors: Shalini Raghavan, Minneapolis, MN (US); Tom J. Traughber, Austin, TX (US); George Vanecek, Jr., San Jose, CA (US)

(73) Assignee: FAIR ISAAC CORPORATION, Roseville, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/243,428

(22) Filed: Apr. 28, 2021

(65) Prior Publication Data
US 2021/0248021 A1 Aug. 12, 2021

Related U.S. Application Data

(63) Continuation of application No. 15/490,633, filed on Apr. 18, 2017, now Pat. No. 11,016,831, which is a
(Continued)

(51) Int. Cl.
*G06F 9/54* (2006.01)
*G06F 16/11* (2019.01)
*G06F 16/2455* (2019.01)

(52) U.S. Cl.
CPC ............... *G06F 9/546* (2013.01); *G06F 9/54* (2013.01); *G06F 9/541* (2013.01); *G06F 16/116* (2019.01); *G06F 16/24568* (2019.01)

(58) Field of Classification Search
CPC . G06F 9/546; G06F 9/54; G06F 9/541; G06F 16/116; G06F 16/24568
See application file for complete search history.

(56) References Cited

U.S. PATENT DOCUMENTS 6,233,255 B1  5/2001  Kato et al.
8,863,116 B1  10/2014 McCarten et al.
(Continued)

OTHER PUBLICATIONS

Balazinska, "Fault-Tolerance in the Borealis Distributed Stream Processing System", pp. 1-12. (Year: 2013).
(Continued)

*Primary Examiner* — Kevin L Young
*Assistant Examiner* — Phuong N Hoang
(74) *Attorney, Agent, or Firm* — Mintz, Levin, Cohn, Ferris, Glovsky and Popeo, P.C.

(57) ABSTRACT

A data object from a data source is received by a distributed process in a data stream. The distributed process has a sequence of categories, each category containing one or more tasks that operate on the data object. The data object includes files that can be processed by the tasks. If the task is able to operate on the data object, then the data object is passed to the task. If the task is unable to operate on the data object, then the files in the data object are passed to a file staging area of the distributed process and stored in memory. The files in the file staging area are passed, in sequence, from the file staging area to the task that was unable to operate on the data object. The data object is outputted to a next category or data sink after being operated on by the task.

20 Claims, 13 Drawing Sheets

Related U.S. Application Data continuation of application No. 14/940,095, filed on Nov. 12, 2015, now Pat. No. 9,632,847.

(60) Provisional application No. 62/078,336, filed on Nov. 11, 2014.

(56) References Cited

U.S. PATENT DOCUMENTS

| | | |
|---|---|---|
| 9,325,758 B2 | 4/2016 | Branson et al. |
| 9,632,847 B2 | 4/2017 | Raghavan et al. |
| 11,016,831 B2* | 5/2021 | Raghavan ............... G06F 9/546 |
| 2003/0152084 A1 | 8/2003 | Lee et al. |
| 2005/0198111 A1 | 9/2005 | Lamb et al. |
| 2007/0002946 A1 | 1/2007 | Bouton et al. |
| 2007/0214142 A1 | 9/2007 | Goyal et al. |
| 2008/0184139 A1 | 7/2008 | Stewart et al. |
| 2008/0205314 A1 | 8/2008 | Pecen |
| 2008/0235260 A1 | 9/2008 | Han et al. |
| 2008/0288595 A1 | 11/2008 | Liu et al. |
| 2010/0027052 A1 | 2/2010 | Ferlitsch |
| 2010/0106853 A1 | 4/2010 | Kashiyama et al. |
| 2010/0205475 A1 | 8/2010 | Ebrahimi et al. |
| 2012/0030247 A1* | 2/2012 | Yambal ................ G06F 16/119 707/E17.058 |
| 2013/0081042 A1 | 3/2013 | Branson et al. |
| 2014/0089929 A1 | 3/2014 | Branson et al. |
| 2015/0120739 A1 | 4/2015 | Hosokawa et al. |
| 2015/0271236 A1 | 9/2015 | Chen et al. |
| 2015/0370837 A1 | 12/2015 | Branson et al. |
| 2016/0132360 A1 | 5/2016 | Raghavan et al. |
| 2016/0154853 A1 | 6/2016 | Sax et al. |
| 2016/0196188 A1* | 7/2016 | Castellanos ......... G06F 11/1438 714/19 |
| 2017/0293654 A1* | 10/2017 | Cao ..................... G06F 16/2456 |
| 2018/0129713 A1* | 5/2018 | Zhang ............... G06F 16/24568 |

OTHER PUBLICATIONS

Cai, Haoxuan. "Type Systems for Coordination Languages." Dissertation, Imperial College London Department of Computing, 2012. 183 pages.

Foster, Kevin, et al. "IBM InfoSphere Streams: Assembling Continuous Insight in the Information Revolution." IBM, 2011. pp. 17-26, 33-89, 120-125, 139-155, 179-193, 203-275.

Gorawski, Marcin and Aleksander Chroszcz. "The Design of Stream Database Engine in Concurrent Environment." On the Move to Meaningful Internet Systems: OTM 2009, Berlin, Heidelberg, Springer, vol. 5871. 17 pages.

IBM, "Stream processing", pp. 1-2. (Year: 2011).

Nicholls, Peter, et al. "IBM InfoSphere Streams: Accelerating Deployments with Analytic Accelerators." IBM, 2014. Preface and Chapter 2. 47 pages.

* cited by examiner

SYSTEM AND METHOD FOR LINEARIZING MESSAGES FROM DATA SOURCES FOR OPTIMIZED HIGH-PERFORMANCE PROCESSING IN A STREAM PROCESSING SYSTEM

CROSS-REFERENCE TO RELATED APPLICATIONS

The current application is a continuation of and claims priority under 35 U.S.C. § 120 to U.S. patent application Ser. No. 15/490,633 filed Apr. 18, 2017 issued on May 25, 2021 as U.S. Pat. No. 11,016,831, and U.S. patent application Ser. No. 14/940,095 filed Nov. 12, 2015 issued on Apr. 25, 2017 as U.S. Pat. No. 9,632,847, which claims priority under 35 U.S.C. § 119(e) to application No. 62/078,336 filed Nov. 11, 2014. The content of the above-noted applications are incorporated herein by reference in their entirety.

TECHNICAL FIELD

The subject matter described herein relates to the processing of data objects by a distributed stream computing system, and more specifically, the linearized processing of data objects.

BACKGROUND

Systems that continuously process large volumes and varying velocities of messages from external data sources may do so using a stream-processing paradigm that executes processes as distributed data-flow topologies consisting of tasks and interconnected by streams. These processes are bound to data sources from which messages are received and subsequently processed. While the process may control how the internal messages are represented and exchanged within the internal streams, the process needs to accept from a wide range of protocols over which the messages are received, the type of bundles that a set of messages may be compressed or encrypted with, or the types of formats the messages may be encoded in by the external data sources. In addition, the received messages may be structured in a variety of hierarchical or flat formats such as URL Query Strings, JSON, CSV, XML, or serialized POJOs, semi-structured in hybrid formats such as emails or logs, or unstructured formats such as text messages.

SUMMARY

In one aspect, a data object from a data source is received by a distributed process in a data stream. The distributed process has a sequence of categories, each category containing one or more tasks that operate on the data object. The data object includes files that can be processed by the tasks. It is determined if each of the tasks can operate on the data object. If the task can operate on the data object, then the data object is passed to the task. If the task is unable to operate on the data object, then the files in the data object are passed to a file staging area of the distributed process and stored in memory. The files in the file staging area are passed, in sequence, from the file staging area to the task that was unable to operate on the data object. The task operates on the data object or the files. The data object is outputted to a next category or data sink after being operated on by the task.

In some variations one or more of the following features can optionally be included in any feasible combination.

An input task configuration in an input data source catalog can be accessed by an input task to operate on the data object from the data source. The input task configuration can parameterize the input task for operation on the data object. The output task configuration in an output data source catalog can be accessed by an output task to operate on the data object. The output task configuration can parameterize the output task for operation on the data object.

The data object can be passed to only one of the tasks present in a category, based on a data object type or a file type of the files in the data object.

The determination of whether a task can operate on the data object can be based on a calculated size for the data object or the files comprising the data object.

The categories can include an in-protocol task category comprising a protocol for receiving the data object; an unbundling task category having a protocol for unbundling the data object and/or the files into the file staging area, the unbundling based on a designation, by a file path, for the files to be unbundled into the file staging area; an unpacking task category having an unpacking task that unpacks messages from the files in the file staging area; a message normalization task category having a one format specific task that converts the messages into the data object; and a validation task category having at least one validation task that can include: conversion of data object field values to a specific format, setting a default value of the data object field values, and rejecting a data object with invalid or out-of-scope data.

The categories can also include: a message generation category having an output message format-specific generation task that can receive the data object and format the file in the data object into a specified format; a packing task category having a packing task that can pack the formatted files into a batch file; a bundling task category having a bundling task that can bundle the batch file into archive bundle; and an out-protocol task category having a one sink task that can deliver the archive bundle to the data sink.

The protocol for receiving the data object can be FTP/S, HTTP/S, Rest, SOAP, or Web Sockets. Also, the protocol for unbundling the data object and/or the files into the file staging area can be based on the data object and/or the files being in a ZIP, RAR, or TAR format.

A reference can be generated and stored in the data object. The reference can reference files in the file staging area. The reference can be updated, added, or deleted, based on changes by the task to the previously referenced files.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The details of one or more variations of the subject matter described herein are set forth in the accompanying drawings.

As used herein, a data object is a general term for a container for tuples. Accordingly, "tuples," as used herein are a generic data object and do not imply any particular type of data object, nor have any inherent or pre-defined properties, unless specifically noted. Tuples are only used to describe data objects moving through the stream processing system described herein. Data objects can include, for example, tuples, files, containers, packages, objects, etc.

In a distributed stream-processing environment, process topologies consist of a set of tasks that are interconnected by streams that move tuples from their upstream tasks to their downstream tasks. As used herein, tasks and task workers can be computer programs or executable code modules that can manipulate tuples or data objects, or transmit/receive tuples or data objects to or from one or more streams. During processing, tasks receive tuples from their input streams and output tuples to their output streams, where each stream has its own stream schema that defines the fields of the stream's tuples. As used in the application, tuples can include any data packet, object, file, etc. that includes information to be operated on, transmitted, distributed, etc. Also as used in the application, a stream or streams may be a physical stream, e.g. wired or wireless transmission of data, or may be virtual, e.g. movement of tuples in computer memory or changes of state in the tuple objects according to tasks or other prescribed processes or operations.

Figure 1:
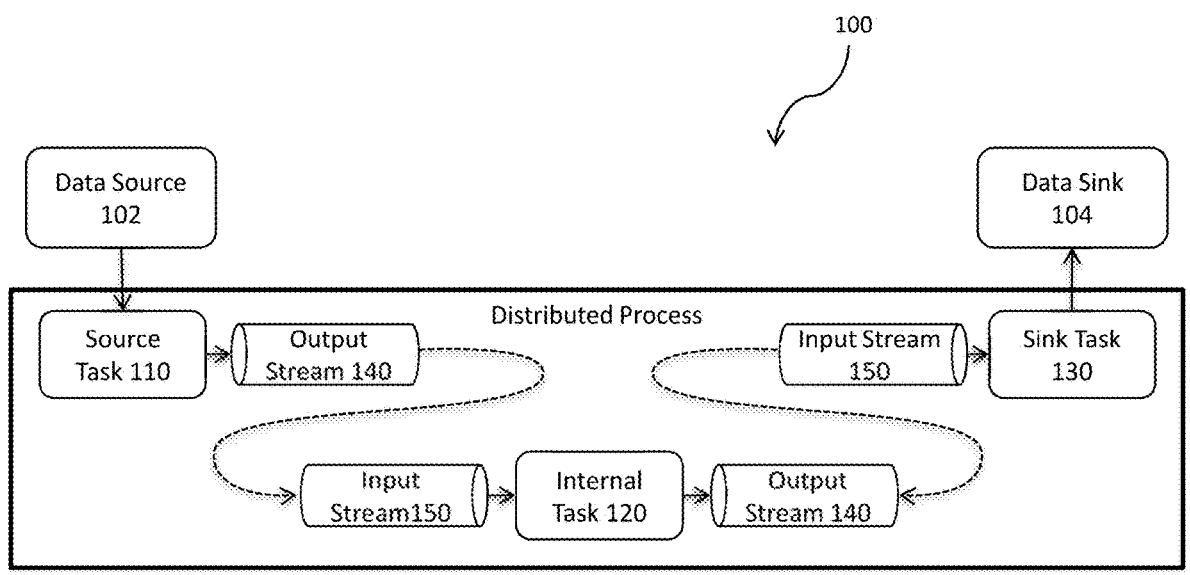
FIG. 1 shows a distributed process with tasks and interconnecting streams.

FIG. 1 shows a distributed process 100 with tasks and interconnecting streams. Tasks can be any operation, procedure, program flow step, etc. that operates on the tuples. The distributed process 100 can accept data from a data source 102, and can output data to a data sink 104. The distributed process 100 can include multiple types of tasks, e.g. source tasks 110, internal tasks 120, and sink tasks 130 that perform operations on artifacts within the streams, e.g. tuples. The internal tasks 120 have both output streams 140 and input streams 150. The sink tasks 130 have only the input streams 150, but none of the output streams 140. The source tasks 110 have none of the input streams 150, but have output streams 140. Streams connecting the tasks can include both the output streams 140 and the input streams 150.

Figure 2:
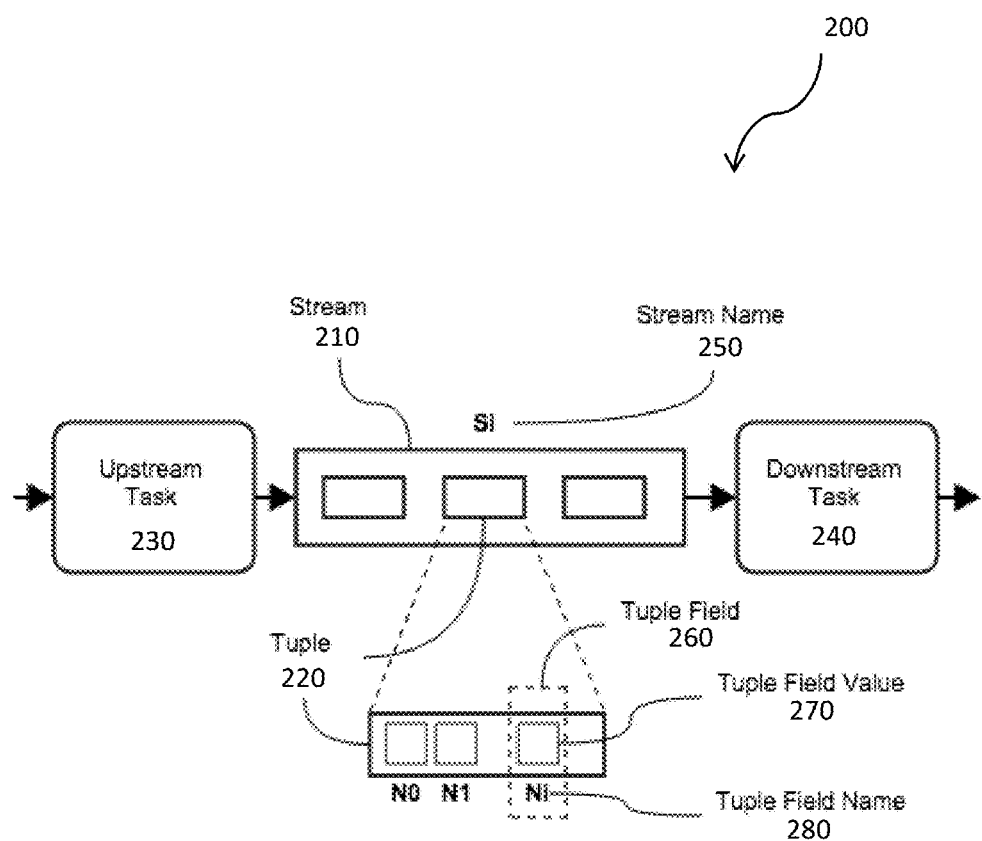
FIG. 2 shows a stream flow diagram stream passing a tuple between an upstream task and a downstream task.

FIG. 2 shows a stream flow diagram 200 stream passing a tuple 220 between an upstream task 230 and a downstream task 240. Note that stream 210 is the same as the output stream 140 for the upstream task 230; and the stream 210 is the same as the input stream 150 for the downstream task 240. Each of the streams 210 can have a stream name 250 that uniquely identifies the stream 210. There can be any number of the streams 210, e.g. 1 . . . N, with a particular stream 210 being indexed by the variable i, thus the $i^{th}$ stream has the name $S_i$. Each tuple 220 can include of a sequence of one or more tuple fields 260. Each of the tuple fields 260 can be defined by a tuple field name 280 and a tuple field value 270. Similar to the streams 210, there may be any number of the tuples 220, where each of the tuples 220 can have any number of the tuple fields 260, the tuple field values 270, and the tuple field names 280. Similar to the streams 210, the tuple field names 280 are shown as $N_0$, $N_1$, . . . $N_i$, etc.

Figure 3:
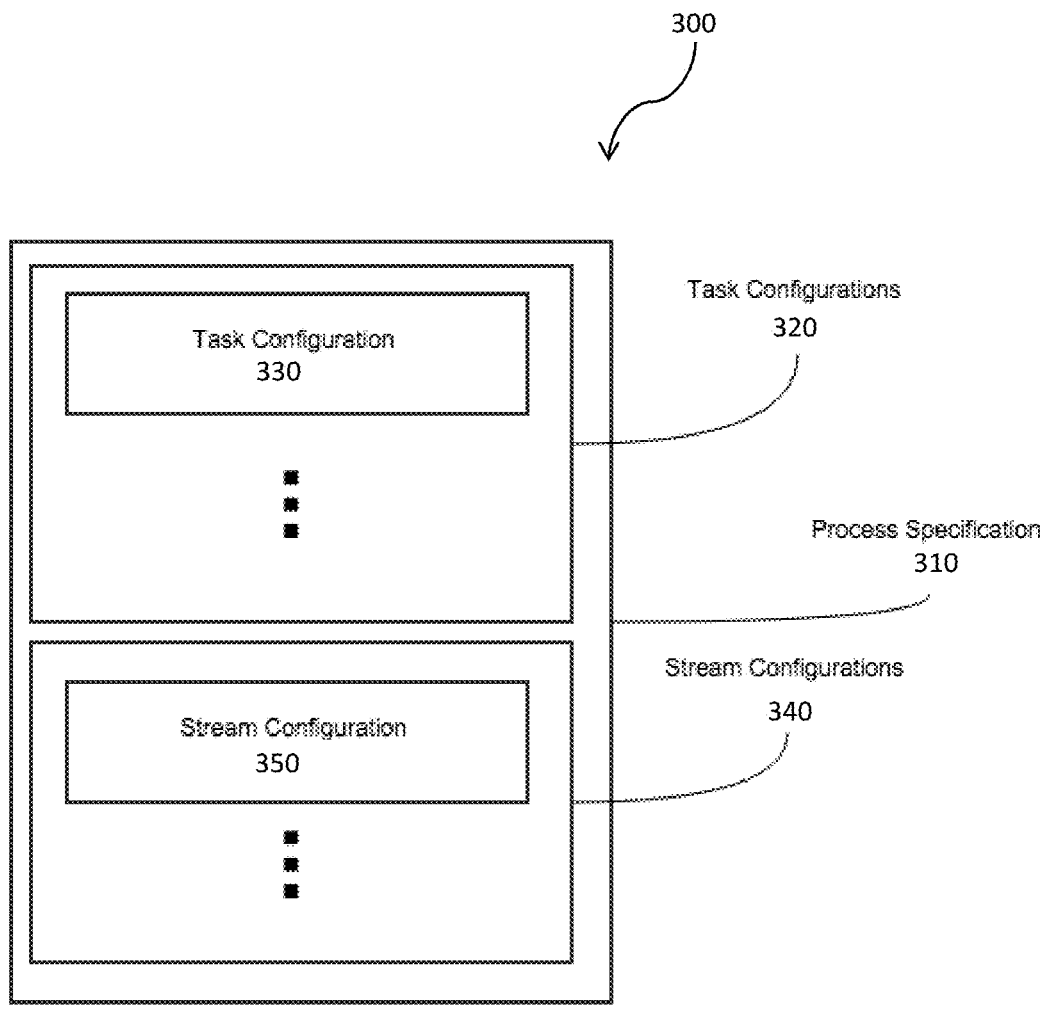
FIG. 3 is a block diagram of a process specification.

FIG. 3 is a block diagram 300 of a process specification 310. The process specification 310 can include a group of task configurations 320 that can include multiple task configurations 330. Similarly, the process specification 310 can include stream configurations 340 that can include multiple stream configurations 350.

Figure 4:
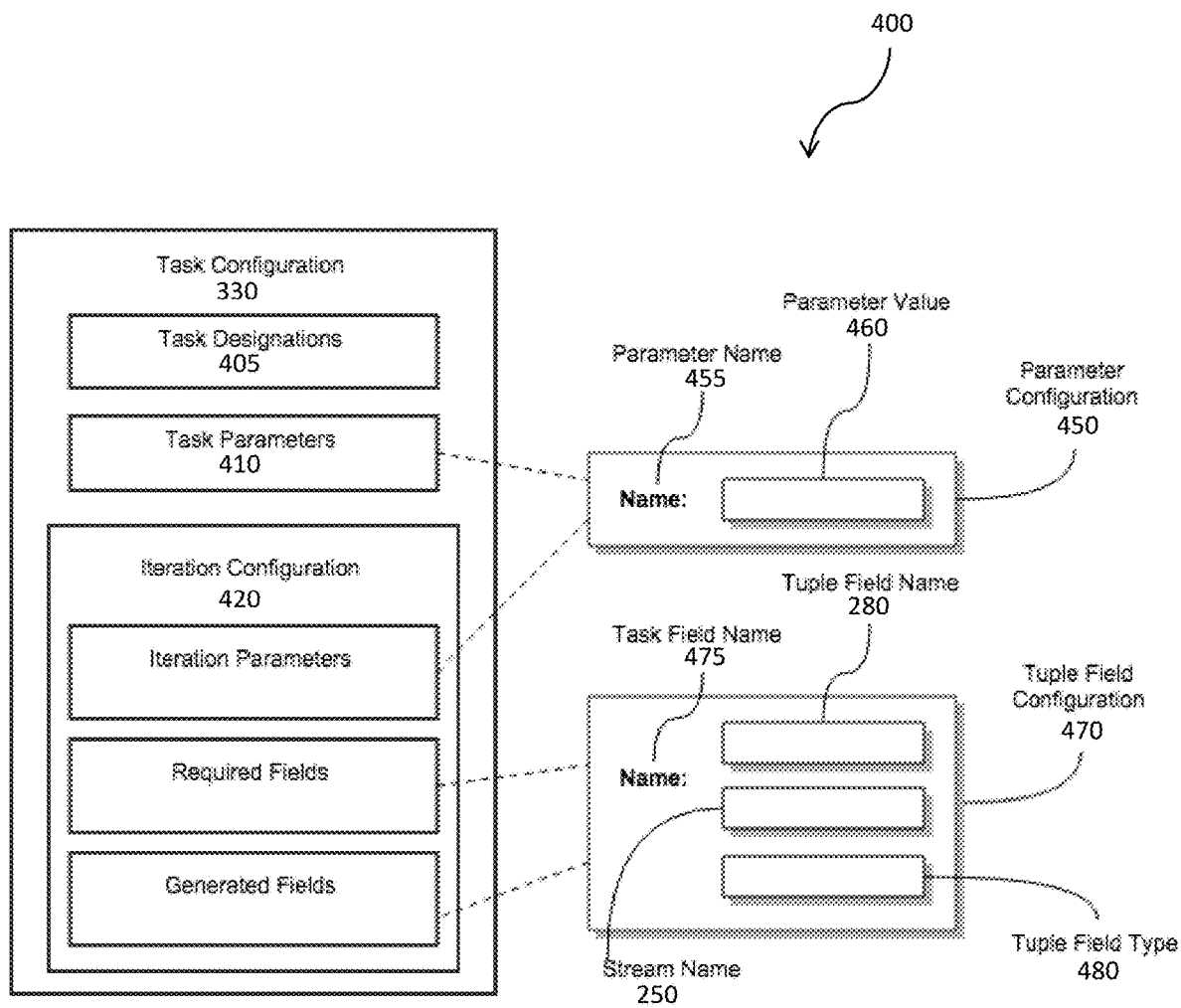
FIG. 4 is a block diagram of a task configuration.

FIG. 4 is a block diagram 400 of a task configuration 330. A task configuration 330 is fixed by its task, but parameterized by the user that is configuring the process specification 310 for execution. In the task configuration 330, task designations 405 contain details about the task that may be referred to by a user. The task designations 405 can include the task name, its origin, version, etc. The task designations 405 can also provide the processing mode, which can determine how the task processes input tuples and generates output tuples. The processing mode can be either a full tuple processing mode or a partial tuple processing mode. The full tuple processing mode and the partial tuple processing mode are described in greater detail in the discussion of FIGS. 8 and 9.

The task configuration 330 can also contain task parameters 410 that offer the user a set of task-required parameters that are independent of any one tuple or field being processed.

The task configuration 330 can contain an iteration configuration 420, which is used by the task to process input tuples and fields and/or generate the output tuples and fields. Input tuples refer to tuples prior to being operated upon by a task, whereas output tuples are the tuples that result of the input tuple having been operated upon by the task. The iteration configuration 420 can contain an iteration parameter 425 used to parameterize the iteration, a required field 430 used to designate one or more input tuple fields, and a generated field 435 generated by the input tuple being operated on by the task. How the iteration configuration 420 is interpreted by a task depends on whether the task is using the full tuple or the partial tuple processing modes. The task parameter 410 and the iteration parameter 425 can both include a parameter configuration 450. The parameter configuration 450 can include the parameter name 455 and the parameter value 460. Similarly, the required field 430, and the generated field 435 can include a tuple field configuration 470. The tuple field configuration 470 can include the task field name 475 which is the task's internal name to be associated with the tuple field name 280, stream name 250, and tuple field type 480. In general, for any one particular task, the specification of iterations, required fields, and generated fields is optional, and depends on the particular functional requirements of the task.

Figure 5:
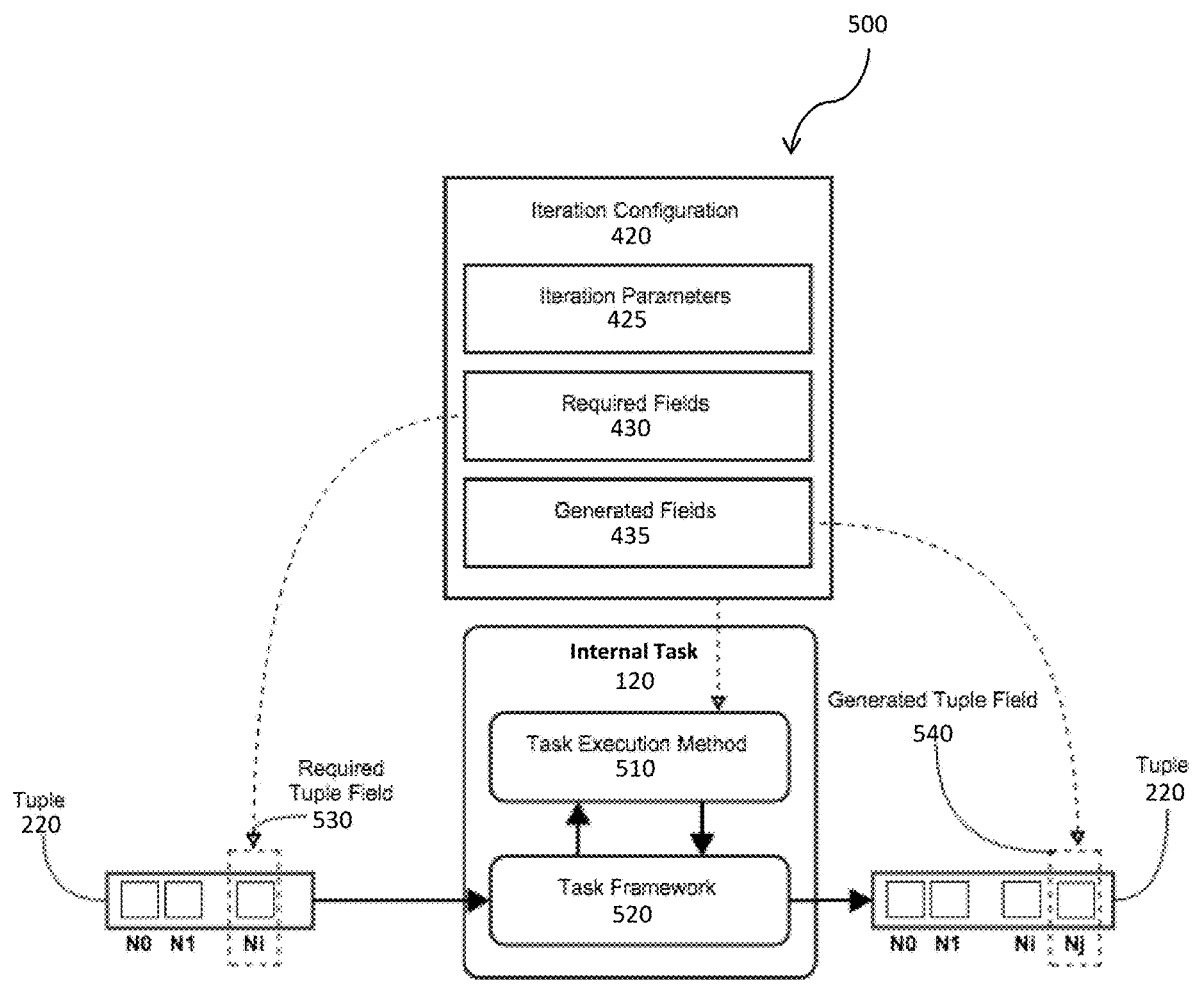
FIG. 5 is a process flow diagram illustrating the internal task creating the generated tuple field.

FIG. 5 is a process flow diagram 500 illustrating the internal task 120 creating the generated tuple field 540. The internal task 120 can have a task execution method 510 and a task framework 520 that can be used by the iteration configuration 420 to create the required tuple fields 530, prior to the tuple 220 being processed by the internal task 120. The iteration configuration 420 can also create the generated tuple fields 540, after the tuple 220 has been processed by the internal task 120.

Figure 6:
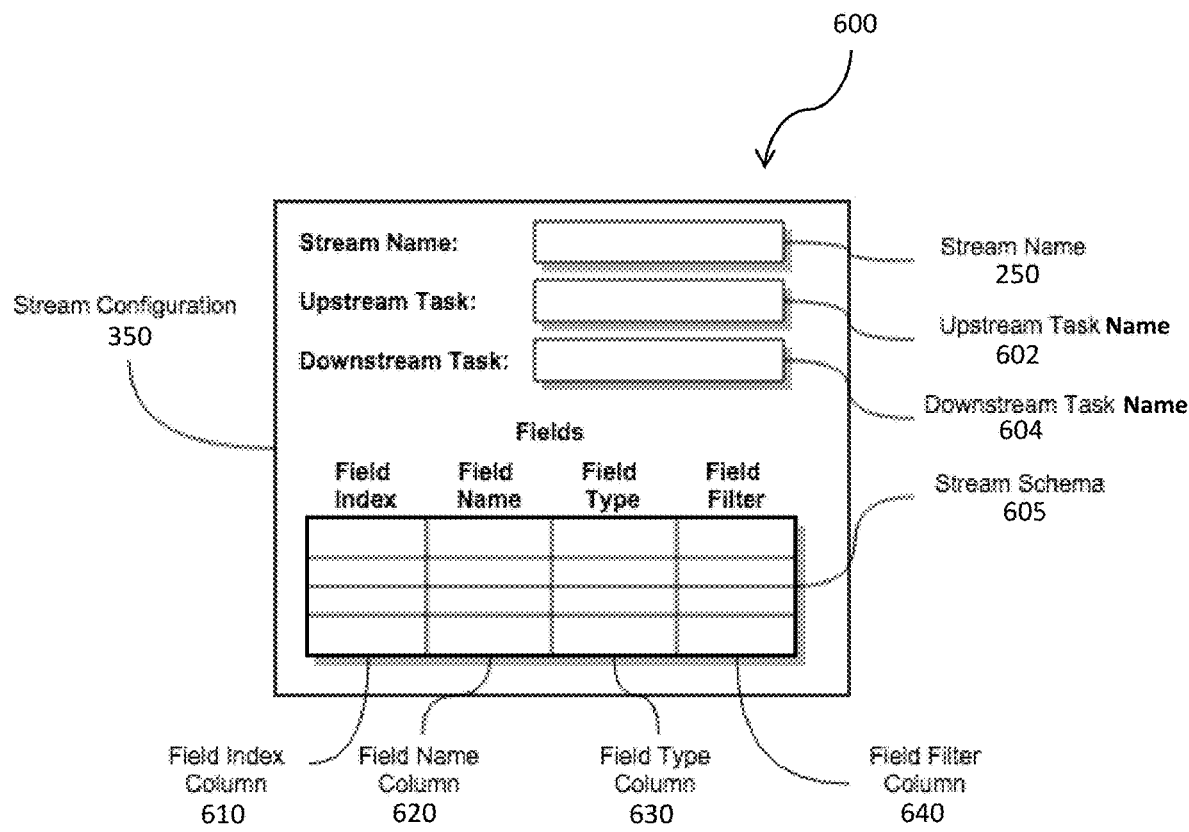
FIG. 6 is a block diagram of a stream configuration.

FIG. 6 is a block diagram 600 the stream configuration 350. The stream configuration 350 can include the features described above, namely the stream name 250, upstream task name 602, and the downstream task name 604. Also, the stream configuration 350 can include a stream schema 605. The stream schema 605 describes operations that can be performed on tuples 220 within the stream 210. The stream schema 605 can contain additional fields in an array, tabular, etc. format. The additional fields, as shown in the figure in tabular representation, can include a field index column 610, a field name column 620, a field type column 630, and a field filter column 640. The field index column 610 can include index numbers, pointers, or other reference data to identify a particular row with which to specify an operation corresponding to the stream configuration 350. The field name column 620 is similar to the field index column 610, but can be strings, character arrays, etc. that further identify the operation. Unlike the field index column 610, values in the field name column 620 need not be unique and can be more descriptive than the field index column 610. The field type column 630 can provide the data type of the field. The field filter column 640 can provide an indication whether to either keep or drop the tuple field 260 from the tuple 220 before the tuple 220 is delivered by the stream 210 to the downstream task 240. In one implementation, when configuring the process specification, users may only toggle the keep/drop values in the field filter column 640. The other columns are not user modifiable. In other implementations, depending on the application, the other columns can be made to be modifiable or not.

Figure 7:
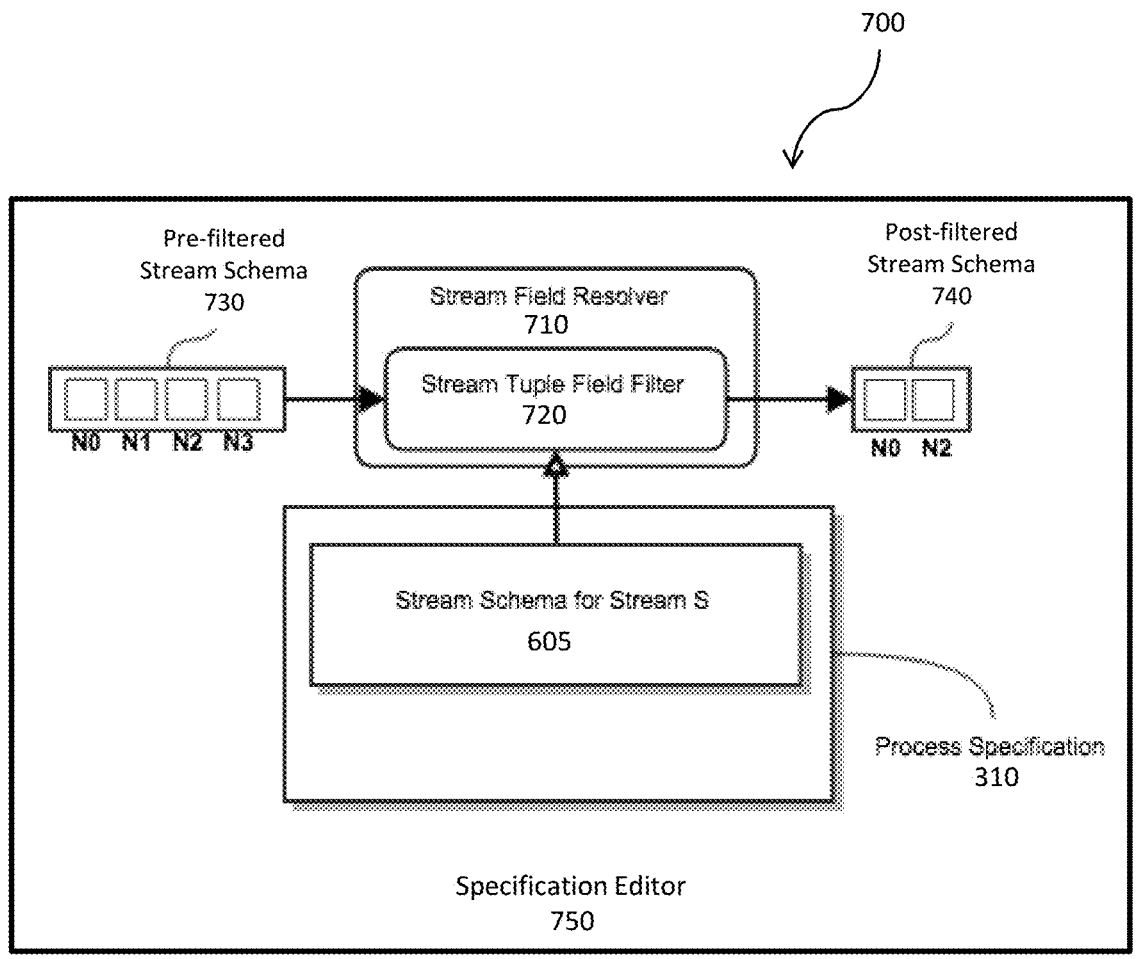
FIG. 7 is a block diagram illustrating creation of a stream schema that can be subsequently applied to the tuple.

FIG. 7 is a block diagram 700 illustrating creation of the stream schema 605 that can be subsequently applied to the tuple 220. The stream field resolver 710 can be responsible for updating the stream schemas (and therefore the process specification 310) after changes are made by a specification editor 750. One example of an operation performed by the stream field resolver 710 is the application of a stream tuple field filter 720. The stream tuple field filter 720 can operate on the pre-filtered stream schema 730 to filter the pre-filtered stream schema 730 to create a post-filtered stream schema 740. The filtering can include adding or removing tuple fields 260 from the stream schema 605. The post-filtered stream schema 740 can then be written to the process specification 310. As shown in the example illustrated in FIG. 7, the pre-filtered stream schema 730 has fields with values $N_0$, $N_1$, $N_2$, and $N_3$ that are input into the stream field resolver 710. The stream tuple field filter 720 takes the pre-filtered stream schema 730 and extracts one or more fields from the pre-filtered stream schema 730 according to the instructions of the stream tuple field filter 720. In this case, fields having $N_1$ and $N_3$ have been removed from the stream schema 605. The resulting stream schema then is the post-filtered stream schema 740. As stated above, there can be one or more operations forming a library of operations within the stream filed resolver 710. In one implementation, the instructions for the operations to apply to the pre-filtered stream schemas 730 can be specified by a process specification 310, acting as a library of one or more stream schemas 605 to apply to the streams 210.

The stream schemas 605 can be specified, at design time, in the process specification 310 by the specification editor 750. The specification editor 750 can be in a graphical user interface displayed on a client computer that allows a user to select tasks from a task library and connect the selected tasks by one or more streams. As tasks are selected and streams connecting the tasks are defined, some of the required fields 430 and generated fields 435 can be automatically established by the specification editor 750 or other connected process. Optionally, the user can specify other generated fields by modifying the iteration configuration 420.

Upon modification of the distributed process defined by the specification editor 750, for example adding/removing streams, tasks, or fields, the changes can be propagated through the distributed process. For example, adding a generated field 435 to the iteration configuration 420 can add the field to all downstream stream schemas. Similarly, filtering out of fields by the stream tuple field filter 720 can remove the field from all downstream schemas.

At any stage of development of the distributed process, or just prior to execution, the specification editor 750 can validate the distributed process to confirm that all stream schemas 605 are resolved. Resolution of the stream schemas 605 in order to generate a consistent distributed process is further described in reference to FIG. 8.

Figure 8:
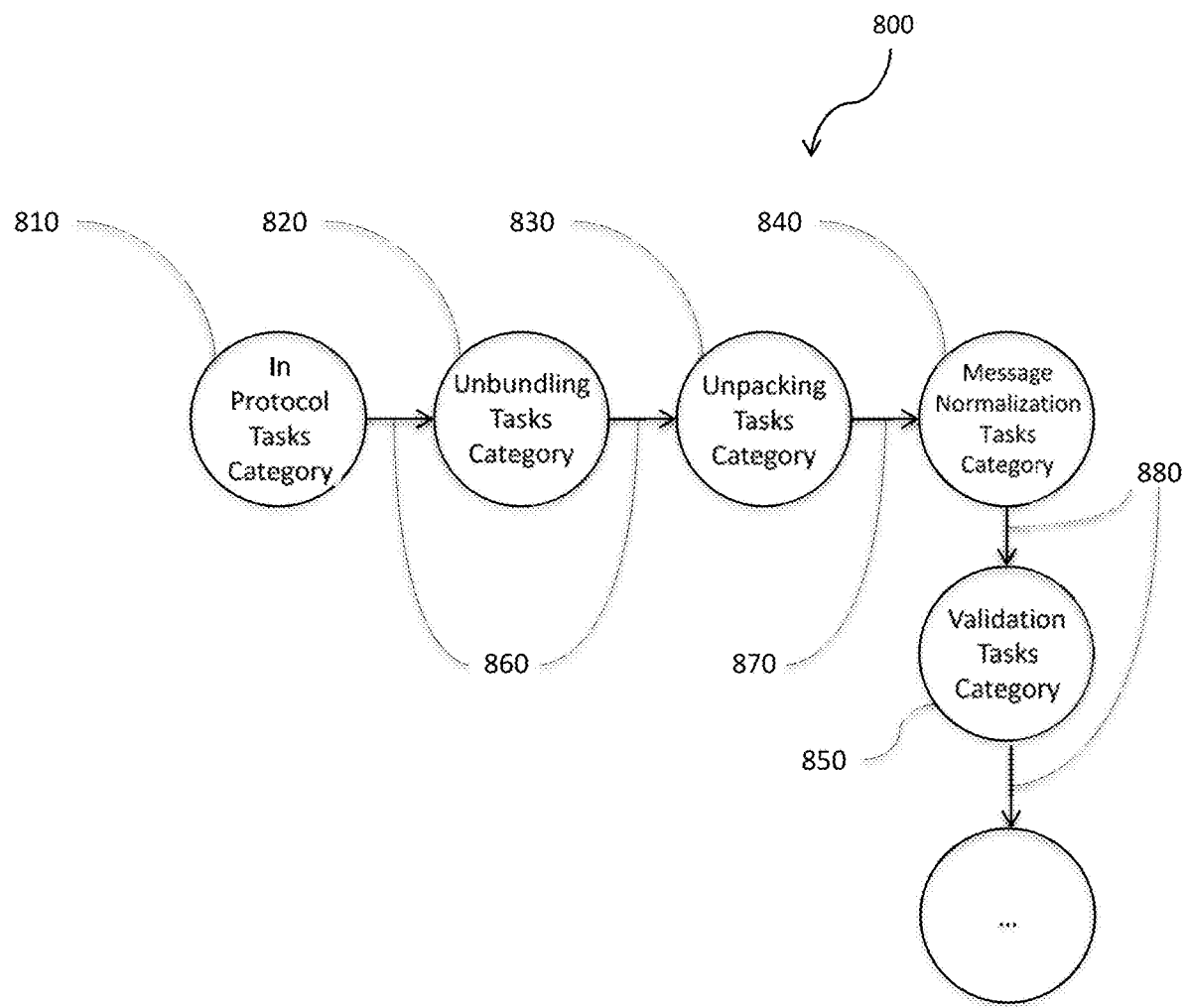
FIG. 8 is a process flow diagram illustrating the sequencing of a data receiving portion of a distributed process.

FIG. 8 is a process flow diagram 800 illustrating the sequencing of a data receiving portion of a distributed process.

A distributed stream-processing system can be designed around a partitioning of its set of reusable tasks into categories and a formulation of a partial order that takes into account the level of usable informational content of receiving and outputting tuples by the tasks of each category. This task category partial order is shown in three connected parts designated as the data receiving (FIG. 8), data transformation (FIG. 9), and data emission (FIG. 10) portions. In all three figures, the categories can be added or removed as needed, except for the in protocol tasks category and the out protocol tasks category (shown in FIG. 10). The topology of a distributed process can be created by choosing a desired element out of each category. The task selection from each category is based on the specific nature of the messages (data) provided by the data sources 102 and the specific information content need to be generated for the desired data sink 104. The data receiving portion can include an in protocol tasks category 810, an unbundling tasks category 820, an unpacking tasks category 830, a message normalization tasks category 840, and a validation tasks category 850.

The in protocol tasks category 810 can contain source tasks 110 that deal with the network protocol needed to either pull or receive data from data sources 102. This can include e.g. the FTP/S, HTTP/S Rest or SOAP, Web Sockets, proprietary protocols supported by custom client/server APIs, etc. The received messages (to be converted into tuples) can be received either individually, or packaged and bundled into containers and delivered as batch files. In one implementation, the in protocol tasks category can output a tuple 860 that can contain two fields, a first field and a second field. The first field can be named MsgOrFSAPath and can be of string type. The first field can contain an individual message e.g., CSV Line, JSON object, XML element, etc. or a fully qualified path to a batch file written into the file staging area. The second field can be named IsMessage and be of Boolean type. The second field indicates whether the first field contains a message or a path. In other implementations, the names and types of the first field and/or the second field can be redefined without affecting their respective functions. For example, instead of a Boolean type, the second field could be an integer that represents the type of data in the first field, 0 for a path, 1 for a string, etc.

The unbundling tasks category 820 can be used to unbundle files and create individual files. In one implementation, the unbundling tasks category 820 can be used only if the selected task's upstream source task taken from the in-protocol tasks category 810 generates a tuple with the second field containing a value of "false", the first field containing a file path into the file staging area, described in FIG. 11, and the batch file was an archive containing one or more files, each containing a collection of messages. This can be the case for batch files collected into archives e.g. ZIP, RAR, TAR, etc. The tasks can unbundle the batch files from the archive and create individual batch files in the file staging area. For each, a tuple 860 would be outputted, with the first field containing the unbundled batch file path.

The unpacking tasks category 830 can contain tasks to unpack individual messages from batch files. The unpacking is based on the specific formatting of the messages, e.g. CSV files, JSON array files, XML sequence files, etc. In one implementation, the unpacking tasks category 830 can be used only when the input tuple contains a file path for a batch file in a file staging area. The file staging area is described further in reference to FIG. 11. The outputted tuples 870 can contain a field that contains the unpacked message from the batch file. In one implementation, this can be a string field with the text, CSV Line, JSON object, or XML element for a single message.

The message normalization tasks category 840 can contain the message format specific tasks that convert a single message in its native string format (e.g., CSV, JSON, XML) into the canonical form, a tuple 880. The output stream defines the fixed schema for the tuple fields 260.

The validation tasks category 850 can contain tasks that validate the data type contents of individual fields 260 within each tuple 870. The tasks can look at designated fields in each tuple 870, normalize and validate their content. This can include normalizing (i.e., converting field values 270) data type formats e.g. email addresses, phone numbers, social-security numbers, dates, etc. The tasks can also be configured to provide default values. The tasks can also be configured to reject tuples with invalid or out-of-scope data.

Figure 9:
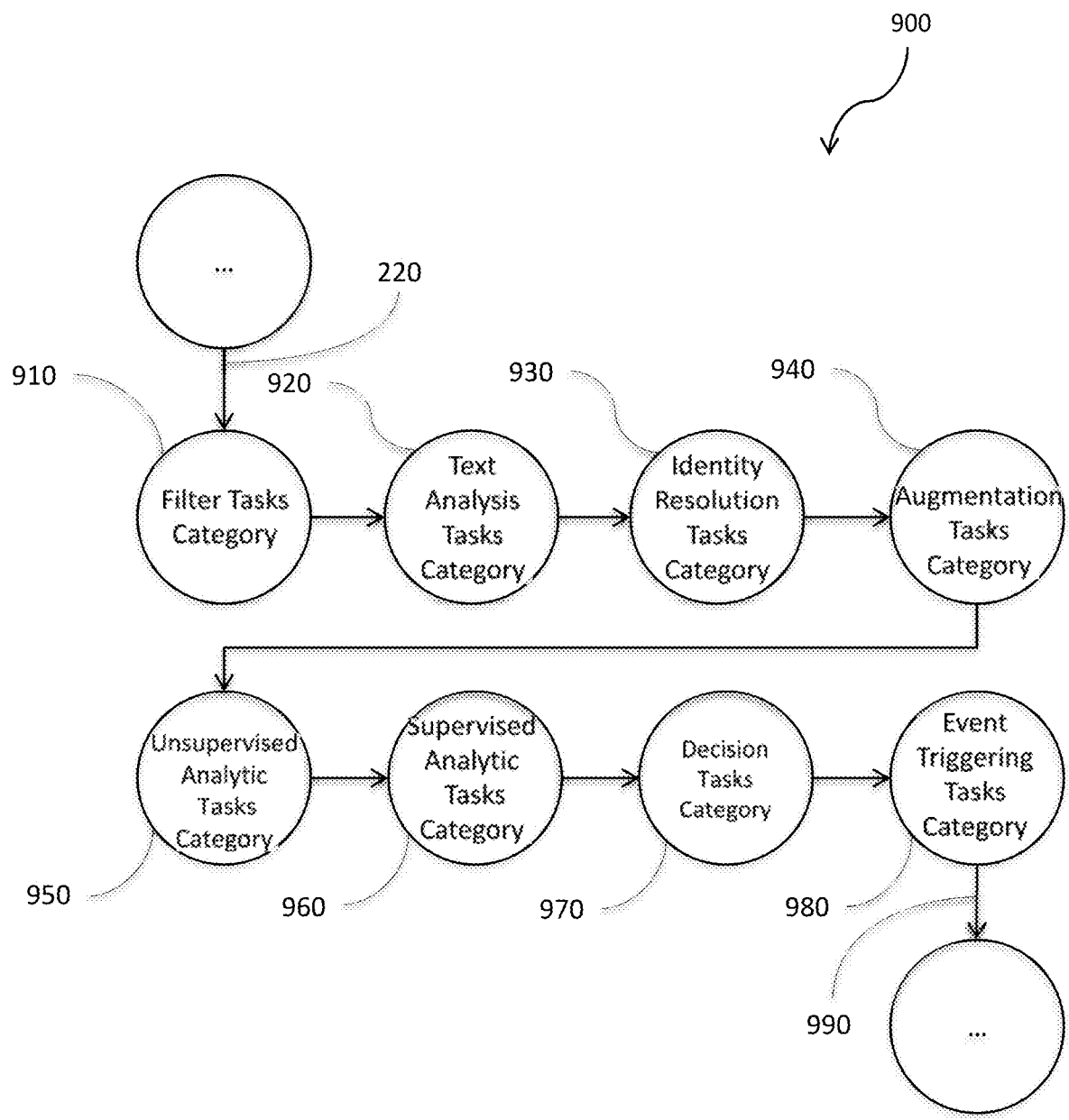
FIG. 9 is a process flow diagram illustrating the sequencing of a data transformation portion of a distributed process.

FIG. 9 is a process flow diagram 900 illustrating the sequencing of a data transformation portion of a distributed process. The transformation portion relates to the creation of the specific message/event processing function of a distributed process. The transformation portion can include a filter tasks category 910, a text analysis tasks category 920, an identity resolution tasks category 930, an augmentation tasks category 940, an unsupervised analytic tasks category 950, a supervised analytic tasks category 960, a complex event recognition tasks category 970, and an event trigger tasks category 980. The tasks and streams generated from this portion operate efficiently on received messages converted to a canonical form delivered as tuples 870, and output processed tuples 990 to the data emission portion generated section of its distributed process. The portions overall purpose is to increase the information value of each received tuple by filtering, correlating, enriching, analyzing, and adding new fields to downstream tuples.

The filter tasks category 910 contains tasks that execute operations on tuples according to predefined rules. For example, certain data types contained in the tuple can require particular tasks. Another example can be including or excluding tuples from operations depending on the tuple state satisfying established conditions, e.g. Boolean tests, if/then statements, comparisons of tuple field values against established requirements, etc.

The text analysis tasks category 920 can contain tasks that manipulate tuple fields 270 with free form or structured text (e.g. string) content. This can include content ranging from human languages such as English, to machine languages e.g. URLs, queries, name/value formatted query strings, etc. Tasks in the text analysis tasks category 920 can extract parts of speech, do sentiment analysis, or break apart structured text from name value fields, e.g. the URL query strings, email headers, etc.

The identity resolution tasks category 930 can contain tasks that map identity fields from varying domains and contexts to common authoritative identities expected by downstream tasks. In one implementation, this can require correlating several fields such as addresses and phone numbers to gain high probability resolution. In another implementation it can require the use of external value-add services that maintain linked entity repositories for the authoritative identities.

The augmentation tasks category 940 can contain tasks that enrich tuples 870 with information computed from existing tuple fields 270 or based on some existing tuple fields 270 obtained externally from value-add services.

The unsupervised analytic tasks category 950 can contain a set of tasks that utilize a range of unsupervised analytic models to recognize or learn the nature of a domain described by the individual data points streaming in as tuples, and apply those models to classify tuples. In one implementation, a task may be doing cluster analysis and subsequent classification of tuples 870 using the recognized clusters.

The supervised analytic tasks category 960 can contain a set of tasks that utilize a range of supervised analytic models, based on pre-specified trained data, to determine hidden information and then classify tuples 870.

The decision tasks category 970 consists of tasks that can make decisions. These tasks can require that all information needed to make a decision be internalized in the incoming tuples. In other words, the information is contained in the tuples without the need for the tasks in the decision tasks category to access any auxiliary information outside the tasks. Decision tasks can also include the complex event recognition tasks that look for complex patterns in an input stream 150 of tuples 870 and output event tuples 870 that denote complex events.

The event trigger tasks category 980 can contain tasks that accept tuples 870 denoting complex events and provide a range of event-triggered decisions. In one implementation, the event trigger tasks category 980 can be configured with a set of rules that match the event trigger tasks category 980 conditions against the event tuples 870 and trigger actions that may drop, forward or switch a tuple 870 to a specific output stream. The transformed tuple 990 can then be generated and passed to the next stream in the process.

Figure 10:
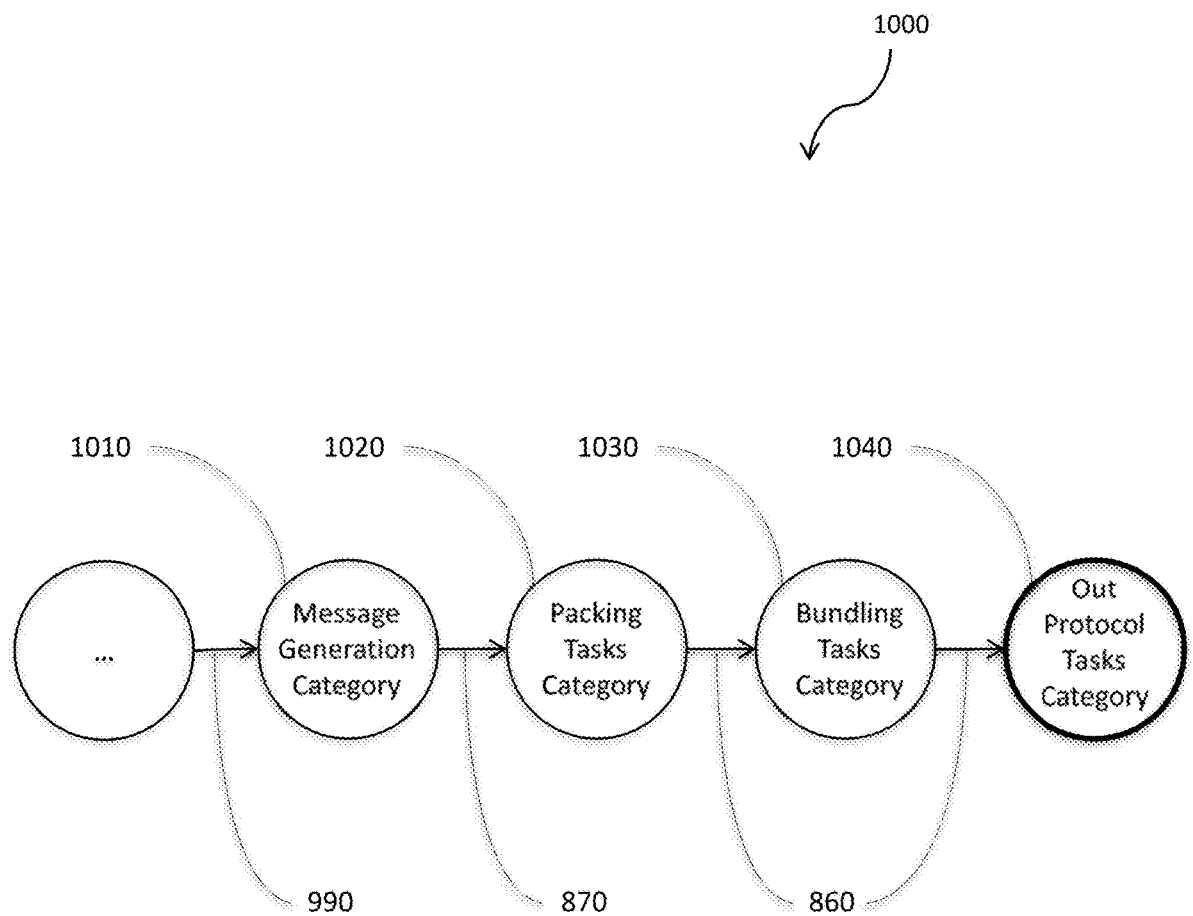
FIG. 10 is a process flow diagram illustrating the sequencing of a data outputting portion of a distributed process.

FIG. 10 is a process flow diagram 1000 illustrating the sequencing of a data emission portion of a distributed process. In one implementation, the data emission portion is the reverse of the data receiving portion described in FIG. 8 and can contain a message generation category 1010, a packing tasks category 1020, a bundling tasks category 1030, and an out protocol tasks category 1040.

The message generation category 1010 can contain output message format specific generation tasks that receive tuples 990 and format those tuples 990 into messages in the given formats (e.g., CSV Lines, JSON or XML). The tasks output tuples 1012 with the two fields MsgOrFSAPath and IsMessage.

The packing tasks category 1020 can contain tasks that package formatted messages into batch files. This is the opposite of what the tasks in the unpacking tasks category 830 perform.

The bundling tasks category 1030 can contain tasks to collect several batch files into archive bundles, such as ZIP or TAR. This is the opposite of the unbundling tasks category 820.

The out protocol tasks category 1040 can contain sink tasks 130 that deliver decision-ready data in the form of messages or batch files to external data sinks 104. This category contains tasks that are the opposite counter parts to tasks in the in protocol tasks category 810.

Figure 11:
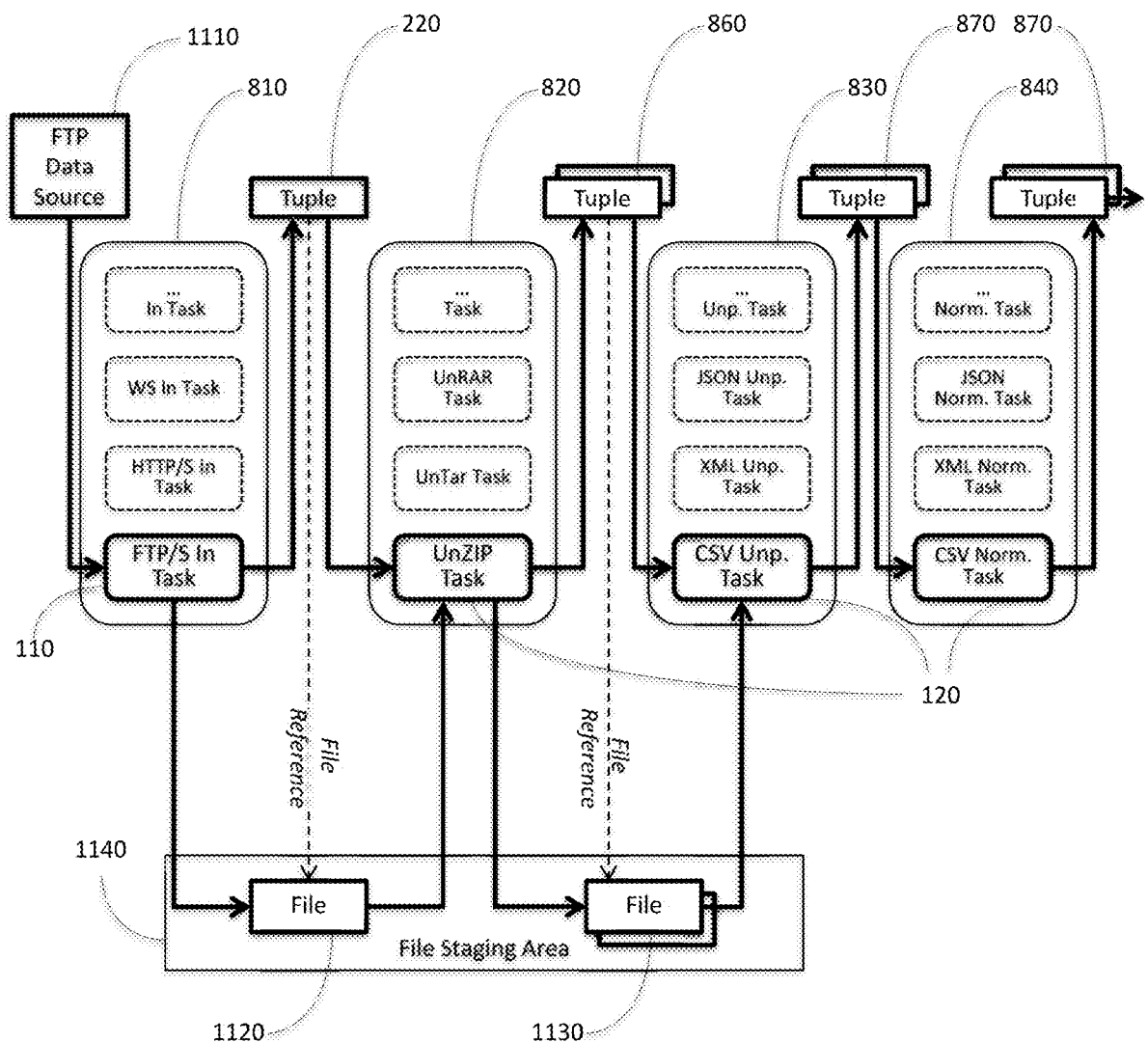
FIG. 11 is a process flow diagram illustrating the data receiving portion of a process topology.

FIG. 11 is a process flow diagram illustrating the data receiving portion of a process topology. FIG. 11 illustrates one example of the data receiving portion in a topology of a distributed process 106 that receives, from an FTP data source 1110, CSV messages bundled into a zip file 1120 containing CSV batch files 1130.

The source task 110 can be selected from the in protocol tasks category 810 that generates a tuple 220 containing a field with a reference to the received file written to the file staging area 1140. The tuple 220 can then passed to the unbundling task category 820 where internal task 120 can be used to unzip the file 1120 as referenced by the tuple 220 and can generate a new file reference for each unzipped file 1120 in the unbundled tuple 860. Next, at the unpacking task category 830, the unbundled files 1130 can be unpacked according to the file type to generate an unpacked tuple 870. Next, at the message normalization task category 840, the unpacked tuple is normalized as described above and placed into a canonical form that can be used by other tasks in the distributed process 106, for example the data transformation portion of the distributed process 106.

Given a properly created topology for a given distributed process 106 in terms of its specific tasks and streams, for the distributed process to be executable it can require a process specification 310 with fully specified task configuration 330 for each task and a stream configuration 350 for each stream.

In another implementation, there can also be a file staging area 1140 that takes files and distributes the files in stages to the specified tasks. For example, the tuple 220 may be too large to process by the selected task at 820. Instead of the process being interrupted, the tuple 220 is either passed by value or by reference (dashed line) to the file staging area 1140. The tuple itself can also include a reference, stored in the tuple itself, which references the files in the file staging area. The file staging area 1140 can allow the files 1120 that contain the contents of the tuple 220 to be operated on by the task 120 in a controlled manner and still retain a link to the tuple that is being processed along the stream. For example, after unzipping the tuple 220 and or file 1120, if the internal task 120 in the unpacking task category 830 is unable to process the tuple 860, then the unzipped tuple 860 is held in the file staging area 1140 as a series of unzipped files 1130 for controlled processing by the internal task 120. The references in the tuple 860 can be updated to refer to the series of unzipped files 1130 instead of the zipped file 1120. The references can be updated, added, or deleted, based on changes by the task to the previously referenced files.

Figure 12:
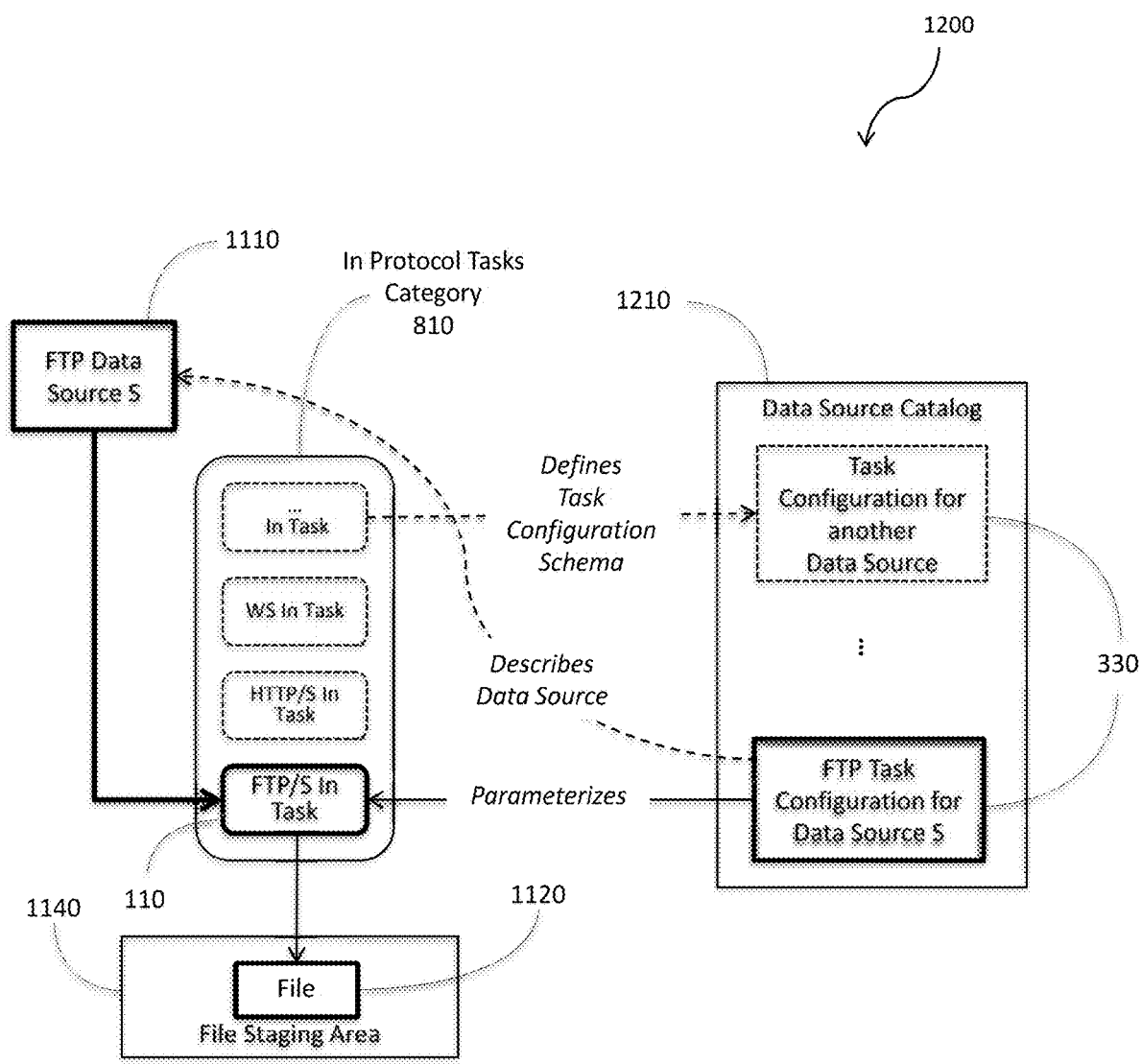
FIG. 12 is a process flow diagram illustrating the use of task configurations of the in protocol task category.

FIG. 12 is a process flow diagram illustrating the use of task configurations of the in protocol task category. A system that adopts the above methods and mechanism can leverage fully orchestrated but partially specified topologies in setting up more than one distributed processes for physically different but logically identical data sources and data sinks through the use of a data source catalog 1210 and a data sink catalog (described in FIG. 13). The implementation shown in FIG. 12 is similar to the example shown in FIG. 11; taking an FTP data source and using the file staging area 1140 to hold files 1120 to be used by the source task 110. One difference is that the data source catalog 1000 can capture the task configurations 330 for the appropriate source tasks 110 of the in-protocol task category 810 for a specific data source 1110. In the implementation shown, the type of source task 110 is an FTP/S task, and it writes batch files 1120 to the file staging area 1140. The properties and attributes related to this are all part of the task configuration 330. Given this data source catalog 1210 entry, any distributed process that starts with a similar source task 110 can be quickly bound to the data source by using that data source's task configuration 330 from the data source catalog 1210. Also, the task configuration 330 for the data source 1110 also has all necessary parameters required by the associated tasks to connect to, gain access, import, and deliver its data, be it message, a batch file, etc.

Figure 13:
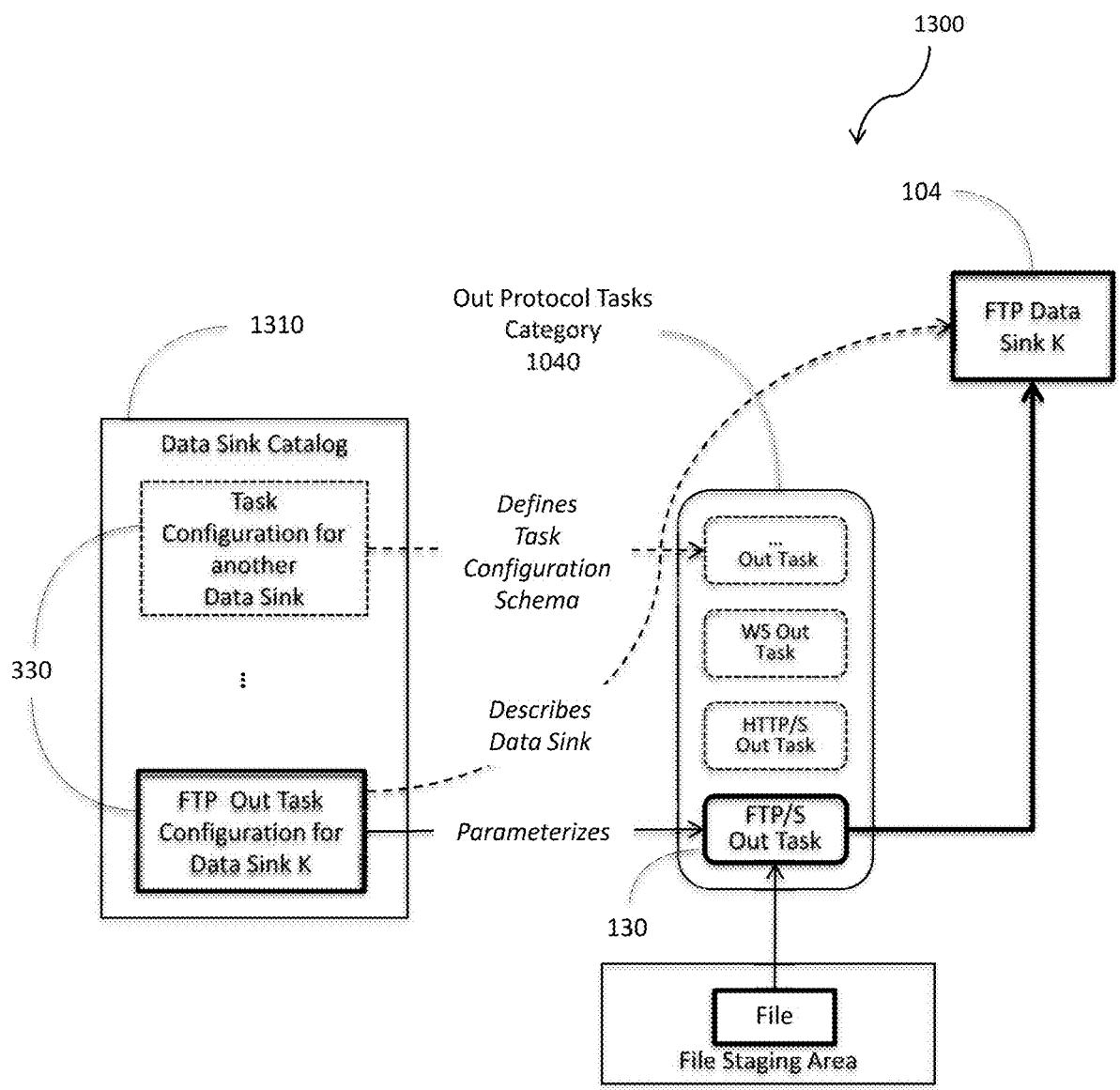
FIG. 13 is a process flow diagram illustrating the use of task configurations of the out protocol task category.

FIG. 13 is a process flow diagram illustrating the use of task configurations of the out protocol task category. In another implementation, similar to that shown in FIG. 12, the data sink catalog 1310 can capture the task configurations 330 for the appropriate sink tasks 130 of the out-protocol task category 1040 for a specific data sink 104. Given this data sink catalog 1310 entry, any distributed process that ends with a similar sink task 130 may be quickly bound to the data sink by using that data sink's task configuration 330 from the data sink catalog 1310.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer implemented method comprising:
   receiving, by at least one programmable processor, a data object at a distributed process from a data source, the data object including a plurality of files;
   passing, by the at least one programmable processor, the plurality of files to a file staging area of the distributed process, the passing of the plurality of files at the file staging area being based on determining that a task of the distributed process is unable to operate on the data object;
   generating, by the at least one programmable processor, a tuple from the data object received from the data source, the tuple comprising a first field and a second field, the first field containing a file reference referring to the plurality of files in the file staging area, and the second field being configured to store a value indicative that the first field contains the file reference;
   unbundling, by the at least one programmable processor, the plurality of files at the file staging area by an unbundling task, the unbundling task configured to create at least one batch file in the file staging area based on at least the value in the second field stored at the tuple;
   extracting, by the at least one programmable processor, a portion of files associated with the file reference from the plurality of files to generate a processed tuple;
   converting, by the at least one programmable processor, the portion of files in the processed tuple into an output tuple based at least on a string format of the file reference associated with the portion of files; and
   transmitting, by the at least one programmable processor, the output tuple to a data sink.

2. The method of claim 1, further comprising redirecting, by the at least one programmable processor, the tuple to the file staging area instead of to a downstream task, in response to determining the downstream task is unable to process the plurality of files.

3. The method of claim 1, wherein the data object received from the data source is a protocol selected from one of: FTP/S, HTTP/S, Rest, SOAP, or Web Sockets.

4. The method of claim 1, wherein the unbundling is based at least on a type of file bundling comprising at least one of ZIP, RAR, or TAR compression formats.

5. The method of claim 1, wherein the unbundling task further comprises:
  outputting, by the at least one programmable processor, the tuple comprising a file path reference corresponding to the at least one batch file stored at the file staging area.

6. The method of claim 1, further comprising:
  unpacking, by the at least one programmable processor, the at least one batch file in the file staging area, the at least one batch file referenced by the tuple; and
  generating, by the at least one programmable processor, an unpacked file reference stored in the tuple based at least on a formatting type of the unpacked file reference.

7. The method of claim 6, wherein the processed tuple has a second file reference to the portion of files, and the unpacked file reference has the formatting type comprising at least one of CSV, JSON, or XML.

8. A computer program product comprising a non-transient, machine-readable medium storing instructions which, when executed by at least one programmable processor, cause the at least one programmable processor to perform operations comprising:
  receiving a data object at a distributed process from a data source, the data object including a plurality of files;
  passing the plurality of files to the file staging area of the distributed process, the passing of the plurality of files at the file staging area is based on determining that a task of the distributed process is unable to operate on the data object;
  generating a tuple from the data object received from the data source, the tuple comprising a first field and a second field, the first field containing a file reference referring to the plurality of files in the file staging area, and the second field being configured to store a value indicative that the first field contains the file reference;
  unbundling the plurality of files at the file staging area by an unbundling task of the distributed process, the unbundling task configured to create at least one batch file in the file staging area based on at least the value in the second field stored at the tuple;
  extracting a portion of files associated with the file reference from the plurality of files to generate a processed tuple;
  converting the portion of files in the processed tuple into an output tuple based at least on a native string format of the file reference associated with the portion of files; and
  transmitting the output tuple to a data sink.

9. The computer program product of claim 8, wherein the operations further comprise:
  redirecting the tuple to the file staging area instead of to a downstream task, in response to determining the downstream task is unable to process the plurality of files.

10. The computer program product of claim 8, wherein the data object received from the data source is a protocol selected from one of: FTP/S, HTTP/S, Rest, SOAP, or Web Sockets.

11. The computer program product of claim 8, wherein the unbundling is based at least on a type of file bundling comprising at least one of ZIP, RAR, or TAR compression formats.

12. The computer program product of claim 8, wherein the unbundling task further comprises:
  outputting the tuple comprising a file path reference corresponding to the batch file stored at the file staging area.

13. The computer program product of claim 8, wherein the operations further comprise:
  unpacking the at least one batch file in the file staging area, the at least one batch file referenced by the tuple; and
  generating an unpacked file reference stored in the tuple based at least on a formatting type of the unpacked file reference.

14. The computer program product of claim 13, wherein the processed tuple has a second file reference to the portion of files, and the unpacked file reference has the formatting type comprising at least one of CSV, JSON, or XML.

15. A system comprising:
  at least one programmable processor to perform operations comprising:
    receiving a data object at a distributed process from a data source, the data object including a plurality of files;
    passing the plurality of files to a file staging area of the distributed process, the passing of the plurality of files at the file staging area being based on determining that a task of the distributed process is unable to operate on the data object;
    generating a tuple from the data object received from the data source, the tuple comprising a first field and a second field, the first field containing a file reference referring to the plurality of files in the file staging area, and the second field being configured to store a value indicative that the first field contains the file reference;
    unbundling the plurality of files at the file staging area by an unbundling task of the distributed process, the unbundling task configured to create at least one batch file in the file staging area based on at least the value in the second field stored at the tuple;
    extracting a portion of files associated with the file reference from the plurality of files to generate a processed tuple;
    converting the portion of files in the processed tuple into an output tuple based at least on a native string format of the file reference associated with the portion of files; and
    transmitting the output tuple to a data sink.

16. The system of claim 15, wherein the operations further comprise:
  redirecting the tuple to the file staging area instead of to a downstream task, in response to determining the downstream task is unable to process the plurality of files.

17. The system of claim 15, wherein the data object received from the data source is a protocol selected from one of: FTP/S, HTTP/S, Rest, SOAP, or Web Sockets.

18. The system of claim 15, wherein the unbundling is based at least on a type of file bundling comprising at least one of ZIP, RAR, or TAR compression formats.

19. The system of claim 15, wherein the unbundling task further comprises:
  outputting the tuple comprising a file path reference corresponding to the at least one batch file stored at the file staging area.

20. The system of claim 15, wherein the operations further comprise:

unpacking the at least one batch file in the file staging area, the at least one batch file referenced by the tuple; and generating an unpacked file reference stored in the tuple based at least on a formatting type of the unpacked file reference.

* * * * *